Patented July 2, 1940

2,206,022

UNITED STATES PATENT OFFICE 2,206,022

POLYMERIZATION OF VINYLIDENE CHLORIDE

Edgar C. Britton and Clyde W. Davis, Midland, Mich., assignors to The Dow Chemical Company, Midland, Mich., a corporation of Michigan No Drawing. Application November 2, 1937, Serial No. 172,399

8 Claims. (Cl. 260—80)

This invention relates to a method of, and catalysts for, polymerizing vinylidene chloride either alone or conjointly with other polymerizable materials.

It has heretofore been proposed to polymerize vinylidene chloride in the presence of benzoyl peroxide or mixtures thereof with other catalytic agents such as tetraethyl lead, nickel carbonyl, chloroacetyl chloride and other substances which have no catalytic effect alone, but which stimulate the benzoyl peroxide and tetraethyl lead to catalytic activity. The principal objection to such a catalyst mixture arises from the fact that after polymerization is complete the residual catalyst will, if allowed to remain in the polymer, decompose and cause discoloration when the polymer is subjected to elevated temperatures. The necessary extraction steps are at best only partially effective and are time consuming and expensive. Vinylidene chloride can be polymerized to a certain extent through the action of light but this in itself is not sufficiently effective to provide a commercially feasible polymerization process.

It is, accordingly, an object of the present invention to provide a method of polymerizing vinylidene chloride and its mixtures with other polymerizable materials through the use of catalytic agents which are less complex and less toxic than those heretofore employed. It is a further object to provide a catalyst or combination of catalysts which is more active than those heretofore employed.

Certain uranium salts, notably the nitrate and acetate have been suggested as catalysts for the polymerization of various unsaturated compounds, but we have found that uranium salts alone are entirely ineffective in producing polymerization of vinylidene chloride.

We have now found that vinylidene chloride and its mixtures with other polymerizable materials can be readily polymerized more rapidly than has heretofore been possible by carrying out the polymerization in the presence of a small quantity, suitably from 0.125 to 5 per cent by weight, of an alcohol-soluble uranium salt, e. g. uranium nitrate, uranium acetate, etc., and exposing the mixture to the action of light. If the vinylidene chloride mixture containing a uranium salt is kept in the dark, no polymerization whatsoever will occur over an extended period of time, even at temperatures which will ordinarily assist polymerization of vinylidene chloride, i. e. from about 20° C. to about 90° C. When such a sample, however, is removed from the dark and exposed either to sunlight or to the radiant energy from a tungsten filament lamp polymerization occurs quite rapidly. It appears, therefore, that in order to be effective as a catalyst, the uranium salts must be assisted or activated by light of the visible spectrum.

In order to effect intimate contact between the vinylidene chloride and the uranium salt the latter may preferably be dissolved in a solvent therefor which is miscible with vinylidene chloride. Among the principal solvents of this type are the lower aliphatic-mono-hydric alcohols, for example, methanol and ethanol. Lower boiling ketones, acetals and esters, e. g. acetone, dimethyl acetal, and ethyl acetate, are also effective solvents. When the catalyst is dissolved in a solvent of the type mentioned polymerization occurs more rapidly than in the absence of such solvent. Dioxan is an especially effective solvent.

The following tables illustrate the advantages accruing to the uses of uranium salts together with light, as catalysts for the polymerization of vinylidene chloride, either alone or in admixture with vinyl chloride. In the experimental runs recorded in the tables, the quantity of polymerizable material employed in each instance was 30 grams. The proportion of polymerizable compounds and solvent employed is given in terms of approximate relative parts by volume. The catalysts employed are designated by the numerals 1–8, inclusive which represent, respectively: (1) uranium nitrate, (2) uranium acetate, (3) equal weights of benzoyl peroxide and uranium acetate, (4) benzoyl peroxide, (5) equal weights of benzoyl peroxide and uranium nitrate, (6) equal weights of tetraethyl lead and uranium nitrate, (7) equal weights of benzoyl peroxide, tetraethyl lead, and chloroacetyl chloride, and (8) equal weights of the components of catalyst No. 7 and uranium nitrate.

The column of the tables headed "Solvent" contains numerals and designations of the solvents employed. The numerals in this column refer to the number of parts, by volume, of the solvent employed with the indicated number of parts of polymerizable material. The letter "S" in the column headed "Light" indicates that the sample was placed in an unobstructed position and exposed to sunlight during daytime hours in the period of the experiment. The symbol "L. B." indicates that the sample received its light energy from an ordinary clear glass, 100-watt tungsten filament Mazda lamp.

ing as a catalyst an uranium salt dissolved in a solvent therefor which is miscible with monomeric vinylidene chloride. Table IV compares the catalytic effect of various catalysts, only some of which contain uranium salts.

Reference to the foregoing tables indicate that uranium salts are ineffective as catalysts for the polymerization of vinylidene chloride except

Table I

| Run No. | Vinyl chloride | Vinylidene chloride | Light | Time, hours | Temperature, °C. | Catalyst | | Solvent | Per cent polymerized |
|---|---|---|---|---|---|---|---|---|---|
| | | | | | | No. | Per cent | | |
| | Approx. percent by vol. | Approx. percent by vol. | | | | | | | |
| 1 | 100 | --- | S | 8 | 23 | 1 | 2 | 5.0 C₆H₆ | 0 |
| 2 | 100 | --- | S | 8 | 23 | 1 | 2 | --- | 0 |
| 3 | 50 | --- | S | 6.5 | 23 | 1 | 2 | 50 CH₃OH | 5 |
| 4 | --- | 100 | S | 8 | 23 | 1 | 2 | --- | 15.2 |
| 5 | --- | 50 | S | 8 | 23 | 1 | 2 | 50 C₆H₆ | 13.4 |
| 6 | --- | 50 | S | 6.5 | 23 | 1 | 2 | 50 CH₃OH | 21.6 |
| 7 | --- | 50 | S | 14 | 29 | --- | --- | 50 CH₃OH | 11.8 |
| 8 | --- | 100 | S | 12 | 29 | 2 | 0.25 | 0.5 CH₃OH | 56 |
| 9 | --- | 50 | S | 12 | 29 | 2 | 0.5 | 50 CH₃OH | 35 |

Table II

| Run No. | Vinyl chloride | Vinylidene chloride | Light | Time, hours | Temperature, °C. | Catalyst | | Solvent | Per cent polymerized |
|---|---|---|---|---|---|---|---|---|---|
| | | | | | | No. | Per cent | | |
| | Approx. percent by vol. | Approx. percent by vol. | | | | | | | |
| 1 | --- | 100 | S | 12 | 29 | --- | --- | --- | 21.5 |
| 2 | --- | 100 | L. B. | 72 | 32 | --- | --- | --- | 7.5 |
| 3 | --- | 100 | L. B. | 21.5 | 32 | 1 | 0.25 | 0.5 CH₃OH | 33 |
| 4 | --- | 100 | None | 12 | 29 | 1 | 0.25 | --- | 0.5 |

Table III

| Run No. | Vinyl chloride | Vinylidene chloride | Light | Time, hours | Temperature, °C. | Catalyst | | Solvent | Per cent polymerized |
|---|---|---|---|---|---|---|---|---|---|
| | | | | | | No. | Per cent | | |
| | Approx. percent by vol. | Approx. percent by vol. | | | | | | | |
| 1 | 15 | 35 | S | 14 | 29 | --- | --- | 50 CH₃OH | 5 |
| 2 | 30 | 70 | S | 14.5 | 29 | --- | --- | --- | None |
| 3 | 30 | 70 | S | 8 | 23 | 1 | 2 | --- | 5 |
| 4 | 15 | 35 | S | 6.5 | 23 | 1 | 2 | 50 CH₃OH | 21.6 |
| 5 | 15 | 35 | S | 14 | 29 | 2 | 0.5 | 50 CH₃OH | 10.4 |

Table IV

| Run No. | Vinyl chloride | Vinylidene chloride | Light | Time, hours | Temperature, °C. | Catalyst | | Solvent | Per cent polymerized |
|---|---|---|---|---|---|---|---|---|---|
| | | | | | | No. | Per cent | | |
| | Approx. percent by vol. | Approx. percent by vol. | | | | | | | |
| 1 | 30 | 70 | S | 12 | 29 | 3 | 1 | 5.0 CH₃OH | 30.4 |
| 2 | 30 | 70 | S | 14 | 29 | 4 | 0.5 | 5.0 CH₃OH | 30.8 |
| 3 | 30 | 70 | L. B. | 31 | 33 | 5 | 0.5 | 5.0 CH₃OH | 12.2 |
| 4 | 30 | 70 | L. B. | 31 | 33 | 6 | 0.5 | 5.0 CH₃OH | 30.8 |
| 5 | 30 | 70 | L. B. | 31 | 33 | 7 | 0.75 | 5.0 CH₃OH | 15.4 |
| 6 | 30 | 70 | L. B. | 31 | 33 | 8 | 1 | 5.0 CH₃OH | 22.9 |

Table I is concerned with a study of the polymerization of vinylidene chloride and of vinyl chloride with and without uranium salts as catalysts, and shows the effect of the presence of solvents for such salts. Benzene is a non-solvent for uranium salts. Table II shows the effect of light on the polymerization of vinylidene chloride with and without uranium salts as catalysts. Table III illustrates the practice of our invention as applied to the co-polymerization of vinylidene chloride and vinyl chloride, and gives further evidence of the importance of employing as a catalyst an uranium salt dissolved in a solvent therefor which is miscible with monomeric vinylidene chloride. Table IV compares the catalytic effect of various catalysts, only some of which contain uranium salts.

Reference to the foregoing tables indicate that uranium salts are ineffective as catalysts for the polymerization of vinylidene chloride except in the presence of sunlight. The tables further show that the catalytic effect of uranium salts and light on vinylidene chloride is not produced except in the presence of a solvent for such salts which is miscible with the vinylidene chloride. For example, when a non-solvent such as benzene is employed, the uranium salts exhibit no effect on the rate of polymerization. This point has been borne out by further experiments employing isopropyl ether which is also a non-solvent for uranium salts. In these experiments the uranium salts exhibited no catalytic effect. The amount of solvent required is simply sufficient to dissolve the uranium salt employed as the catalyst. Additional quantities of such solvent do not appear to hinder the reaction, however, and may be employed if desired. The principal advantage obtained by employing direct sunlight as the catalyst assistant is more rapid polymerization due to the greater intensity of light. Other sources of light which may be advantageously employed, include mercury vapor or mercury arc lamps, such as "sun lamps," "Uviol" and "Uviarc" lamps, and the like.

The invention has been illustrated principally with reference to the polymerization of vinylidene chloride and co-polymerization thereof with vinyl chloride. It is also applicable to the preparation of other vinylidene chloride co-polymers such as those wherein the co-polymerized constituent is vinyl acetate, acrylic acid esters, etc.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises co-polymerizing vinylidene chloride and a polymerizable vinyl ester in the presence of between about 0.125 and about 5 per cent by weight of a uranium salt dissolved in a solvent therefor which is miscible with vinylidene chloride, the vinylidene chloride being the predominant polymerizable compound present, and exposing the mixture to the action of light, thereby to produce more co-polymer in a given time than is obtained through the use of either the uranium salt or light alone as the catalyst.

2. The process which comprises polymerizing a monomeric liquid selected from the group consisting of vinylidene chloride and mixtures thereof with polymerizable vinyl esters, wherein the vinylidene chloride is the predominant polymerizable compound present, in the presence of a catalytic amount of a uranium salt dissolved in an organic solvent therefor which is miscible with the monomeric liquid, and in the presence of light from the visible spectrum, thereby to produce more polymer in a given time than is obtained through the use of either the uranium salt or light alone as the catalyst.

3. The process which comprises polymerizing a monomeric liquid selected from the group consisting of vinylidene chloride and mixtures thereof with polymerizable vinyl esters, wherein the vinylidene chloride is the predominant polymerizable compound present, in the presence of an alcoholic solution of a soluble uranium salt and in the presence of light from the visible spectrum, thereby to produce more polymer in a given time than is obtained through the use of either the uranium salt or light alone as the catalyst.

4. The process which comprises polymerizing a monomeric liquid selected from the group consisting of vinylidene chloride and mixtures thereof with polymerizable vinyl esters, wherein the vinylidene chloride is the predominant polymerizable compound present, in the presence of between about 0.125 and about 5 per cent by weight of a uranium salt dissolved in an organic solvent therefor which is miscible with the monomeric liquid, and in the presence of light from the visible spectrum, thereby to produce more polymer in a given time than is obtained through the use of either the uranium salt or light alone as the catalyst.

5. The process which comprises polymerizing vinylidene chloride in the presence of between about 0.125 and about 5 per cent by weight of a uranium salt dissolved in a solvent therefor which is miscible with vinylidene chloride, and exposing the mixture to the action of light from the visible spectrum, thereby to produce more polymer in a given time than is obtained through the use of either the uranium salt or light alone as the catalyst.

6. The process which comprises polymerizing a monomeric liquid selected from the group consisting of vinylidene chloride and mixtures thereof with polymerizable vinyl esters, wherein the vinylidene chloride is the predominant polymerizable compound present, in the presence of between about 0.125 and about 5 per cent by weight of uranium nitrate dissolved in methanol, and exposing the mixture to the action of light from the visible spectrum, thereby to produce more polymer in a given time than is obtained through the use of either the uranium salt or light alone as the catalyst.

7. The process which comprises polymerizing a monomeric liquid selected from the group consisting of vinylidene chloride and mixtures thereof with polymerizable vinyl esters, wherein the vinylidene chloride is the predominant polymerizable compound present, in the presence of between about 0.125 and about 5 per cent by weight of uranium acetate dissolved in methanol, and exposing the mixture to the action of light from the visible spectrum, thereby to produce more polymer in a given time than is obtained through the use of either the uranium salt or light alone as the catalyst.

8. The process which comprises polymerizing a monomeric liquid selected from the group consisting of vinylidene chloride and mixtures thereof with polymerizable vinyl esters, wherein the vinylidene chloride is the predominant polymerizable compound present, in the presence of between about 0.125 and about 5 per cent by weight of a uranium salt dissolved in a solvent therefor which is miscible with the monomeric liquid, and exposing the mixure to the action of light from the visible spectrum, at a temperature between about 20° and about 90° C. until the desired degree of polymerization has occurred, the polymerization rate being more rapid than that obtained from the same monomeric liquid through the use of either the uranium salt or light alone as the catalyst.

EDGAR C. BRITTON.
CLYDE W. DAVIS.